Figure 1:
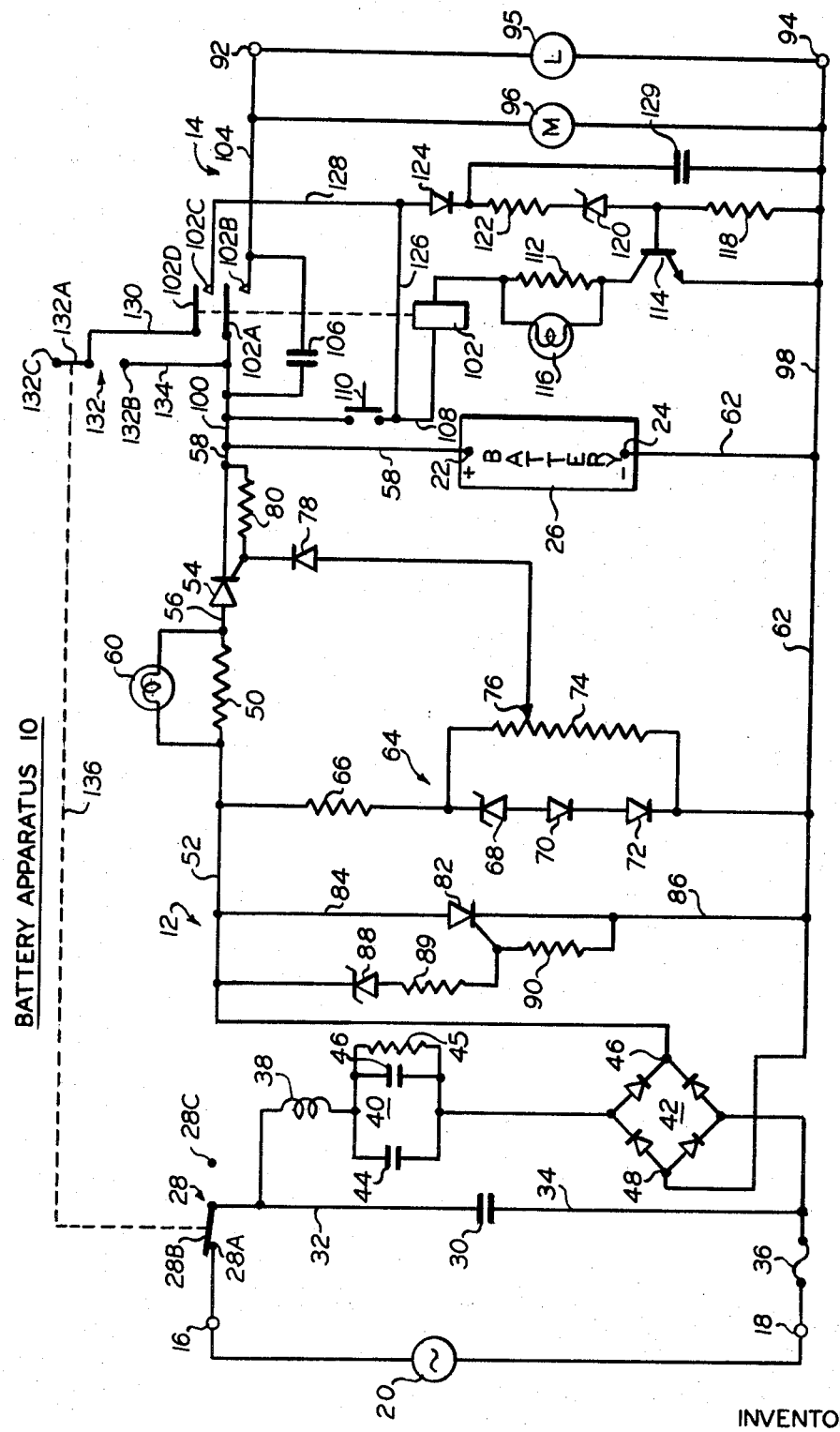

United States Patent

Crawford et al.

[11] 3,708,738
[45] Jan. 2, 1973

[54] BATTERY CHARGING AND DISCHARGING APPARATUS

[75] Inventors: James J. Crawford; James Frezzolini, both of Ringwood, N.J.

[73] Assignee: Frezzolini Electronics Inc., Hawthorne, N.J.

[22] Filed: Dec. 22, 1970

[21] Appl. No.: 100,593

[52] U.S. Cl. .................... 320/9, 317/10, 320/40, 323/22 SC
[51] Int. Cl. .................................................. H02j 7/10
[58] Field of Search .......... 320/2, 5, 6, 7, 8, 9, 39, 40, 320/16, 27, 28; 317/13, 33, 16; 323/225 CR, 22 SC

[56] References Cited

UNITED STATES PATENTS

| | | | |
|---|---|---|---|
| 3,475,653 | 10/1969 | Odenburg et al. | 320/DIG. 2 |
| 3,310,724 | 3/1967 | Grafham | 320/39 |
| 3,321,692 | 5/1967 | Walsh | 320/40 |
| 3,402,339 | 9/1968 | Abrams | 320/40 |
| 3,539,898 | 11/1970 | Tolmie | 320/2 X |
| 3,113,255 | 12/1963 | Eberts | 320/36 |
| 3,286,152 | 11/1966 | Noe | 320/7 |
| 3,454,860 | 7/1969 | Burkett et al. | 320/40 X |

Primary Examiner—J. D. Miller
Assistant Examiner—Robert J. Hickey
Attorney—Paul Fields

[57] ABSTRACT

The apparatus includes a battery charger having a pair of input terminals adapted to be connected to an AC source of potential and a pair of output terminals adapted to be connected to the respective terminals of a battery. A rectifier converts the AC energy to DC. A series connected SCR is operable to connect the source with the battery when the battery potential is below a predetermined value. A reactance is provided to lower the source potential and to obtain substantially constant current for charging purposes. A shunt connected SCR is provided to limit the potential applied to the series SCR when the battery is charged to protect the battery and the series connected SCR.

The apparatus further includes a discharger which is operable to disconnect a load from the battery when the battery potential drops to a preselected value, thereby to protect the battery from completely discharging.

11 Claims, 2 Drawing Figures

FIG. I.

INVENTORS
JAMES J. CRAWFORD
JAMES FREZZOLINI
BY Paul Fields
ATTORNEY.

3,708,738

BATTERY CHARGING AND DISCHARGING APPARATUS

This invention relates generally to apparatus for use with and for protecting a battery and, more particularly, pertains to a portable apparatus for efficiently charging a battery and for preventing complete discharge of the same.

Many battery operated devices such as portable flash guns or television sets utilize rechargable batteries and, as an accommodation to the operator, include circuits which permit the battery to be recharged by connecting the device to a home electrical outlet. Since the battery output potential is substantially less than the house potential of approximately 120 volts, elements must be provided to reduce the potential applied to the battery. Conventially, this reduction in potential is accomplished by utilizing step-down transformers or voltage dividers. However, both of these arrangements have several disadvantages associated with their use.

More specifically, when voltage divider arrangements are utilized, power is dissipated in the resistors forming the divider and thus the overall efficiency of the circuit is decreased. Additionally, means must be provided to dissipate the heat generated by the resistors thereby increasing the cost of the charging device. A similar problem is encountered by utilizing a transformer which produces a hysteresis loss in addition to power losses in the winding of the transformer. Of greater importance is the fact that the transformer, having a ferromagnetic core, substantially increases the overall weight of the battery apparatus and places a severe limitations on its portability.

Accordingly, a primary object of the present invention is to provide a battery apparatus which includes an improved battery charger.

A more specific object of this aspect of the invention is to provide an efficient battery charger which has minimum power losses.

Another object of the invention is the provision of a battery charger which is extremely lightweight and occupies a minimum space and is highly portable.

A further object of this invention resides in the novel details of circuitry which provide a battery charger of the type described wherein charging is done at substantially constant current to minimize the time of the charging cycle.

Another object of the invention is the provision of a fully automated battery charger.

Accordingly, battery apparatus constructed according to the present invention includes a battery charger having a pair of input terminals adapted to be connected to a source of energy and a pair of output terminals adapted to be connected to the respective terminals of a battery. Circuit means connects the pair of input terminals with the pair of output terminals. The circuit means comprises a first switch means connected between at least one of the input and output terminals and is operable form a first state to a second state in response to the potential of the battery for connecting the source of energy with the battery when the battery potential is below a preselected value. Second switch means is provided and is connected between the pair of input terminals and is responsive to the first switch means for shunting the source of energy away from the first switch means when the first switch means is in the first state.

When the battery is utilized to energize a load, there is a possibility that the battery may be completely discharged which, in the case of silver batteries such as silver-zinc or silver-cadmium, may ruin the battery.

Thus, another object of the present invention is the provision of a battery apparatus which includes an improved battery discharger.

More specifically, the discharger includes means which is adapted to disconnect the battery from the load when the battery potential falls below a predetermined value.

Figure 2:
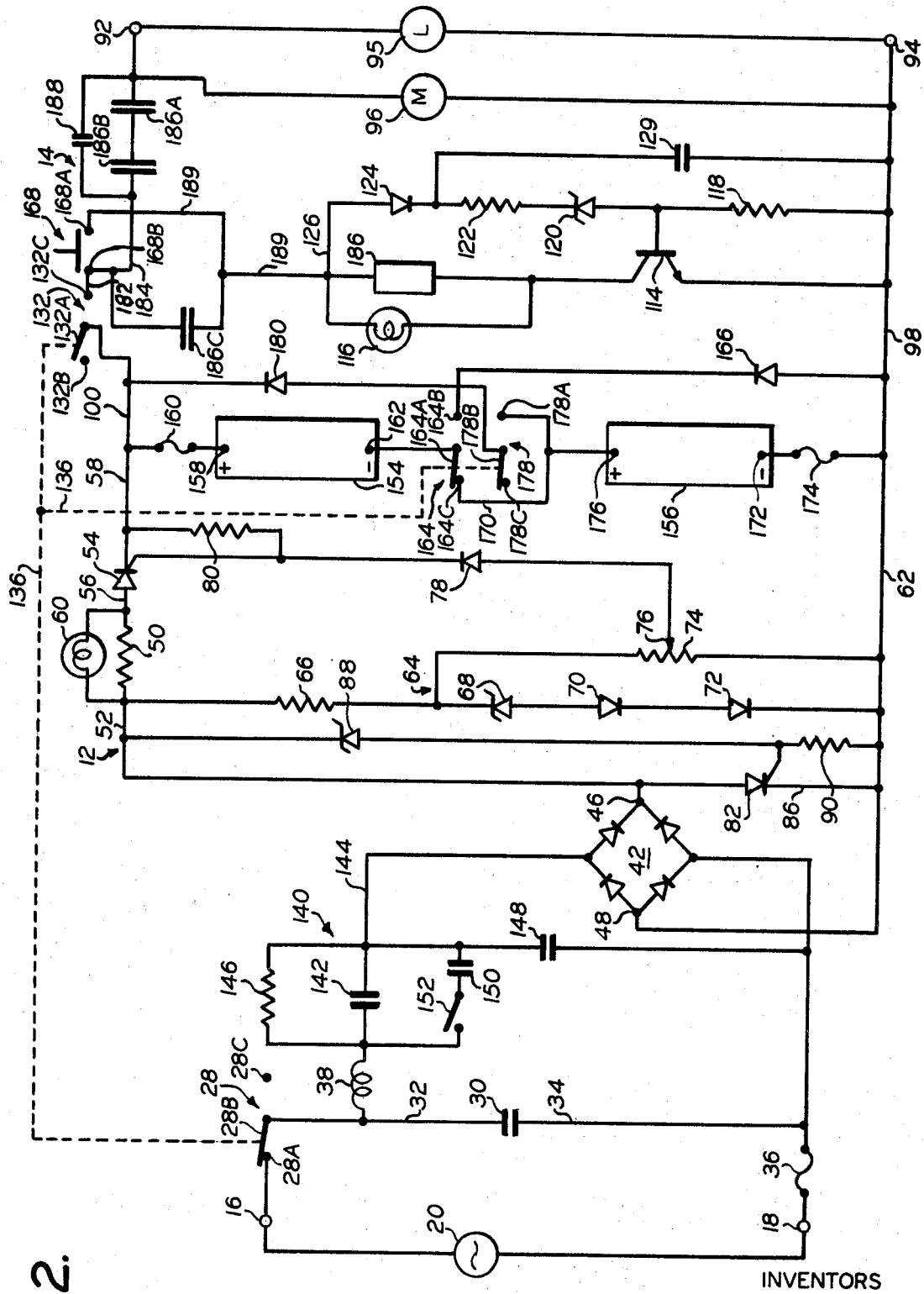

Other features and advantages of the present invention will become more apparent from a consideration of the following detailed description when taken in conjunction with the accompanying drawings, in which:

FIG. 1 is a schematic circuit wiring diagram of a battery apparatus constructed according to the present invention; and, FIG. 2 is a schematic circuit wiring diagram of a modified embodiment of a battery apparatus.

The battery apparatus constructed in accordance with the present invention is designated generally by the reference numeral 10 in the figure and includes a battery charger section 12 and a battery discharger section 14. More specifically, the battery charger 12 includes a pair of input terminals 16 and 18 which are adapted to be connected to an AC source 20. Additionally, a pair of output terminals 22 and 24 are provided which are adapted to be connected to the respective positive terminal and negative terminal of a battery 26. Connected between the input and output terminals are the circuit elements which rectify the AC source 20 and apply a charging current to the battery 26.

More specifically, input terminal 16 is connected to a contact 28A of a single-pole double-throw switch 28. The armature 28B of the switch 28 is connected to one terminal of a capacitor 30 by a lead 32. The other terminal of the capacitor 30 is connected by a lead 34 to the terminal 18 through a fuse 36. The terminal 28C of the switch 28 is unconnected. Connected between the leads 32 and 34 in parallel with the capacitor 30 is a series circuit comprising a radio frequency choke or inductor 38, a reactance 40, and a full wave diode rectifier 42. As shown in the figure, the reactance 40 includes capacitors 44 and 46 connected in parallel. Additionally, a bleeder resistor 45 is connected across the capacitors 44 and 46.

The capacitive reactance or impedance 40 is operable to limit the potential applied to the battery 26. Additionally, as noted in greater detail below, since the reactance is chose to be high in comparison to the battery load, the charging current applied to the battery is substantially constant over the entire charging cycle. Moreover, since a reactance is utilized to obtain a decrease in potential, the power dissipation will be negligible and, accordingly, the overall efficiency of the charger section 12 will be relatively high.

The diode bridge rectifier 42 includes a positive output terminal 46 and a negative output terminal 48. The terminal 46 is connected to one end of a resistor 50 by a lead 52. The other end of the resistor 50 is connected to the anode or input electrode of a silicon controlled rectifier or SCR 54 by a lead 56. The cathode or output electrode of the SCR 54 or semiconductor switch means is connected by a lead 58 to the output terminal 22. A lamp 60 is connected in parallel with the resistor 50. The other output terminal 24 is connected by a lead 62 to the negative output terminal 48 of the rectifier 42.

The conduction of the SCR 54 is controlled by a gate or control signal which is applied to the gate or control electrode thereof from a gate or control signal generator or biasing arrangement 64. More specifically, the biasing arrangement 64 includes a series circuit comprising a resistor 66, a back-biased zener diode 68, a diode 70 and a diode 72 connected between the leads 52 and 62. A potentiometer 74 is connected in parallel with the zener diode 68 and the diodes 70 and 72 and the sliding arm 76 thereof is connected to the gate electrode of the SCR 54 through a diode 78. The diode 78 is polarized so that the cathode electrode thereof is connected to the gate electrode of the SCR 54. A resistor 80 is connected between the gate electrode of the SCR 54 and the lead 58. The sliding arm 76 is set so that the SCR 54 will be biased into conduction when the battery potential is less than the rated terminal voltage of the battery.

For example, in practice the rated battery terminal voltage may be 46.5 volts. Accordingly, the sliding arm 76 is positioned at a point on the potentiometer 74 such that the SCR 54 will conduct and thereby permit charging current to flow to the battery 26 when the terminal voltage of the battery is below 46.5 volts. More particularly, since the potentiometer is connected across zener diode 68 and diodes 70 and 72, the voltage across the potentiometer 74 will remain substantially constant, and the potential at the arm 76 is set to be substantially 46.5 volts in the illustrative example. Thus, as long as the battery potential is below the rated terminal voltage a gating signal will be applied to the gate electrode thereby biasing the SCR 54 into conduction. However, as the battery voltage increases to the rated terminal voltage and finally reaches 46.5 volts, the diode 78 becomes a back-biased and the SCR 54 stops conducting. In this respect, the SCR 54 may be thought of as a first switch which connects the output terminal 22 with the input terminal 16 to permit a charging current to flow to the battery when the potential of the battery is below the rated terminal voltage.

In view of the fact of the fact that no step-down transformer is provided, when the SCR 54 ceases to conduct, the capacitors 44 and 46 will charge up the peak voltage of the input waveform and this peak potential will be applied to the anode electrode of SCR 54. Thus, the peak potential appearing at the anode electrode of the SCR 54 when the battery is fully charged will be approximately 200 volts, assuming that the input source 20 is conventional house current of 120 volts. If the terminal voltage of the battery 26 should drop slightly, the SCR 54 will again begin to conduct. However, since a peak potential of 200 volts appears at the anode electrode, this spike of voltage will pass through the SCR 54 and into the battery 26. In such cases, it has been found that this pulse of energy burns out SCRs of the type under consideration and thereby renders the battery charger 12 useless. Of more importance is the fact that such a spike or pulse of energy ruins the battery 26, particularly if the battery is a co-called silver battery (i.e., a silver-cadmium or a silver-zinc cell).

In order to eliminate the possibility of the above described operation and thereby protect the SCR 54 and the battery 26, an SCR or shunt means 82 is provided. The anode electrode of the SCR 82 is connected to the lead 52 by a lead 84. The cathode electrode thereof is connected by a lead 86 to the lead 62. The gate electrode of the SCR 82 is connected to the junction of a biasing network comprising a back-biased zener diode 88 and a serially connected resistor 89, and a resistor 90. The cathode electrode of diode 88 is connected to the lead 52, and the anode electrode of the diode is connected to the resistor 89. The resistor 90 is connected between the gate electrode of the SCR and the cathode electrode via the lead 86. The SCR 82 and the biasing network may be considered to be a second switch which is adapted to shunt energy away from the SCR 54 when the SCR 82 conducts. Alternatively, the SCR 82 may be considered to be a connecting device which connects the input terminal 16 with the input terminal 18 when the SCR conducts in response to a signal from the biasing network 88-90 which may be considered to be a gating signal generator.

The diode 88 is selected so that it breaks down at a potential slightly higher than the terminal voltage of the battery 26. For example, if the rated terminal voltage of the battery 26 is 46.5 volts, the diode 88 is chosen to break down at approximately 50 volts. Accordingly, when the SCR 54 ceases to conduct in response to the battery being fully charged, the potential on the lead 52 begins to rise. However, as soon as the potential reaches the aforementioned potential of 50 volts, the SCR 82 begins to conduct thereby shunting the energy away from the SCR 54. As a result, the amplitude of the potential appearing on the anode electrode of the SCR 54 will never rise above 50 volts. Thus, if the SCR 54 begins to conduct in response to a drop in the rated terminal voltage of the battery 26, the voltage spike or pulse which passes through the SCR will be no greater than 50 volts. Accordingly, both the SCR 54 and the battery 26 will be protected by the action of the SCR 82.

As noted herein above, the battery apparatus 10, in addition to including a battery charger 12 which fully protects the battery 26 during charge, also includes a novel battery discharger 14 which fully protects the battery 26 during discharge and which is operable to disconnect the battery from a load when the terminal voltage falls to a preselected level, thereby preventing the battery from becoming fully discharged.

More specifically, the battery discharger 14 includes a pair of load terminals 92 and 94 which are adapted to be connected across a load such as a motor 95 and to the output terminals 22 and 24, respectively, through the battery discharger circuit elements. To be more specific, the terminal 94 is connected by a lead 98 to the lead 62 and thereby to the negative output terminal 24. The output terminal 22 is connected via the lead 58 and a lead 100 to the armature 102A of a relay 102. The armature 102A is adapted to engage contact 102B when the relay or relay winding 102 is energized. The contact 102B is connected to the load terminal 92 by a lead 104. A capacitor 106 is connected across the armature 102A and the contact 102B to prevent arcing during separation of the armature and the contact.

One end of the relay winding 102 is connected by a lead 108 to the lead 100 through a normally-open push-button switch 110. The other end of the relay or relay winding 102 is connected through a resistor 112 and the collector-emitter path of a transistor 114 to the lead 98. A lamp 116 is connected in parallel with the resistor 112.

The base electrode of the transistor 114 is connected to the lead 98 through a resistor 118 and to the end of the relay winding 102 connected to the lead 108 through a biasing network including a back-biased zener diode 120, a resistor 122, a diode 124 and a lead 126. A capacitor 129 is connected between the junction of the diode 124 and the resistor 122 and the lead 98. The diode 124 is polarized so that the anode electrode thereof is connected to the lead 126. Additionally, the anode electrode of the diode 124 is connected by a lead 128 to a contact 102C of the relay winding 102. The capacitor 129 and diode 124 isolate the transistor base biasing circuit to prevent transient signals from effecting the operation of the transistor. The contact 102C is adapted to be engaged by an armature 102D when the relay winding 102 is energized. The armature 102D is connected by a lead 130 to the armature 132A of a single-pole double-throw switch 132. A contact 132B of the switch 132 is connected by a lead 134 to the lead 100. The other terminal 132C of the switch 132 is unconnected.

The switch 132 is ganged with the switch 28 of the battery charger 12, as indicated by the dashed line 136. Accordingly, operation of one of the switches will cause the concomitant operation of the other switch. More specifically, when the switch 28 is in the position shown in the figure wherein the armature 28B is in engagement with the contact 28A, the armature 132A of the switch 132 will be in contact with the unconnected terminal 132C. However, when the switches are moved to the opposite position, the armature 132A of the switch 132 will be in engagement with the terminal 132B whereas the armature 28B of the switch 28 will engage the unconnected terminal 28C.

When it is desired to operate the battery discharger 14 and energize the load 95, the push-button 110 is momentarily depressed thereby to energize the relay winding 102. When the relay winding is energized a holding circuit is established about the relay winding so that the relay winding remains energized when the push-button 110 is released and permitted to move to its normally open position. In this respect, the push-button 110 may be considered to be an energizing device.

As long as the battery terminal voltage remains above a preselected level, the zener diode 120 will continue to conduct, thereby permitting current to flow through the collector-emitter path of the transistor 114 to maintain the relay energized. Current flowing through this path will also cause the illumination of the lamp 116 thereby signifying that the relay winding 120 is energized. However, when the battery terminal voltage falls below a preselected level which is insufficient to break down the zener diode 120, the transistor 114 ceases to conduct and the relay winding 102 is de-energized, thereby disconnecting the battery from the load to prevent the complete discharge of the load. The circuit elements of the battery discharger 14 in effect senses the terminal voltage of the battery and disconnects the battery from the load when the terminal voltage falls below the preselected level. Additionally, a voltmeter 96 is connected across the load terminals 92, 94 to visually indicate the battery potential.

It is believed that the operation of the present apparatus will be obvious from a consideration of the above description. However, to briefly summarize the above operation, when it is desired to charge a battery 26, the switch 28 is moved to the position shown in the figure wherein the armature 28B engages the terminal 28A. A DC potential will then appear at the output terminals 46 and 48 of the bridge rectifier 42, as noted in detail above. Assuming that the battery terminal voltage is below the rated potential, current will flow from the output terminal 46, through the resistor 50 and lamp 60, and the SCR 54 and the battery 26 back to the other output terminal of the rectifier 48. The illumination of the lamp 60 signifies that the battery is being charged. Thus, charging of the battery will continue until the battery is charged to its rated terminal voltage. It is emphasized, at this point, that the SCR 54 is always conducting as long as the battery terminal voltage is below the rated voltage (i.e., as long as the diode 78 is not back-biased). Since the reactance of the network 40 is high in comparison to the battery impedance, a substantially constant current will flow into the battery thereby causing the battery to charge up to rated terminal voltage in a minimum amount of time. When the battery is charged up to the rated terminal voltage, the diode 78 becomes back-biased and the SCR 54 ceases to conduct. It is to be noted that the arm 76 of the potentiometer 74 may be varied to obtain the desired cut-off point of the SCR 54.

While the battery 26 is being charged, the terminal voltage of the battery may be monitored by closing the switch 110. Thus, closure of the switch 110 connects the relay 102, the transistor 114 and its base biasing circuit across the battery terminals 22, 24 thereby energizing the relay. Hence, armature 102A engages contact 102B to connect the voltmeter 96 across the battery terminals. When the switch 110 is released, however, no holding circuit will be established since armature 132A of the switch 132 is in engagement with the contact 132C. Accordingly, relay winding 102 is deenergized and the voltmeter 96 is disconnected from the battery 26.

When the SCR 54 ceases to conduct, the potential on the lead 52 attempts to rise to the peak voltage of the input waveform. However, as the input voltage rises slightly above the rated terminal voltage of the battery, the diode 88 breads down and begins to conduct thereby applying a gating signal to the SCR 82. Accordingly, the SCR 82 begins to conduct and shunts energy away from the SCR 54, thereby protecting both the SCR 54 and the battery 26 from energy spikes or pulses of energy. Since no current flows through the SCR 54, the lamp 60 is not illuminated.

After the battery 26 is charged and it is desired to energize the load 95, the switch 132 is operated so that the armature 132A engages the terminal 132B. Accordingly, the armature 28B of the switch 28 will now engage the terminal 28C thereby disconnecting the battery charger 12 from the source 20. The push-button 110 is momentarily depressed thereby closing the push-button and causing the relay 102 to be energized. That is, current flows from the battery 26 through the leads 58 and 100 and the push-button 110 to the leads 126 and 108. Additionally, current flows through the base biasing network of the transistor 114 through the circuit elements comprising the diode 124, resistor 122, zener diode 120, resistor 118 and back to the battery 26 through the leads 98 and 62. Hence, the transistor will conduct current through the relay or relay winding 102, the resistor 112 and associated lamp 116 and the collector-emitter path of the transistor to the lead 98. The lamp 116 will be illuminated to designate that the battery charger is operational.

The energization of the relay winding 102 causes the armature 102A to engage the contact 102B and the armature 102D to engage the contact 102C. Accordingly, even though the push-button 110 is released so that the push-button returns to its normally-open position, current will still flow to the transistor and biasing network through the circuit comprising the energized lead 100, lead 134, the switch 132, lead 130, armature 102D, contact 102C and the lead 128 to the leads 126 and 108. Accordingly, a holding circuit will be established to maintain the relay 102 energized.

Additionally, as noted above, the armature 102A engages the contact 102B thereby connecting the battery 26 across the load terminals 92 and 94 to permit current to flow to the load 95.

When the terminal voltage of the battery 26 begins to decrease to a preselected level as determined by the zener diode 120, the diode 120 will cease to conduct as noted above. Hence, the transistor 114 will cease to conduct and the relay winding 102 will become de-energized. Accordingly, armature 102A and 102D will disengage from the associated contacts 102B and 102C thereby breaking the holding circuit to the relay winding and disconnecting the battery from the load.

Accordingly, a battery apparatus has been disclosed which is extremely portable and lightweight, and which fully protects the battery on both charge and discharge.

FIG. 2 illustrates a modified embodiment of a battery apparatus which is similar to the apparatus shown in FIG. 1. Accordingly, the same reference characters will be used to indicate identical elements i the Figs. Moreover, in the interests of clarity, only the differences in construction between the circuits of FIGS. 1 and 2 will be described in detail.

The circuit of FIG. 2 is adapted to operate in conjunction with either a low source of potential or a high source of potential. Additionally, the circuit o FIG. 2 is adapted to provide a high current output while insuring that no cross-currents flow between parallel-connected batteries.

More specifically, the impedance 40 in the circuit of FIG. 1 is replaced by an impedance 140 in the circuit of FIG. 2 comprising a capacitor 142 connected at one end to the inductor 38 and connected at the other end, by a lead 144, to an input terminal of the rectifier 42. Connected in parallel with the capacitor 142 is a resistor 146 which functions as a bleeder resistor. A shunt capacitor 148 is connected between the lead 144 and the return lead from the other input terminal of the bridge rectifier 42 to the input terminal 18. Additionally a capacitor 150 is connected between the lead 144 and the inductor 38 through a single-pole single-throw switch 152.

The resistor 146 is chosen to have a high resistance with respect to the reactances of the capacitors 142 and 150 so that the impedance of this arrangement is substantially capacitive reactance and thereby introduces a negligible power dissipation and supplies substantially a constant current to the batteries, similar to the impedance 40 of FIG. 1.

When the switch 152 is open, the capacitors 142 and 148 form a voltage divider network whereby a portion of the input voltage is applied across the input terminals of the bridge rectifier 42. This arrangement (i.e., switch 152 open) is used when the input voltage is relatively high, such as 220 volts.

However, when the input voltage is low, such as 110 volts, the switch 152 may be closed to connect the capacitor 150 in parallel with the capacitor 142. Thus, the total impedance of the capacitors 142 and 150 is lower than that of the capacitor 142 and, accordingly, the potential drop across the parallel combination is similarly lower. Thus, even though the source 20 potential is lower, the potential across the capacitor 148 and therefore across the input terminals of the bridge rectifier 42 remains substantially constant.

Accordingly, the circuit of FIG. 2 may be utilized with two different input source potentials simply by operating a switch.

In practice, the battery 26 comprises two commercially available 15 volt cells connected in series to provide an output potential of 30 volts. However, in many applications it may be desirable to provide a high current output at the 15 volt level. Accordingly, the circuit of FIG. 2 is operable to charge the two 15 volt cells while they are connected in series but connects the cells in parallel for discharge while providing means to eliminate cross-current flow between the cells. It is emphasized, however, that the type and value of cells noted above is for illustrative purposes only and is not to be interpreted as being a limitation on the present invention.

More specifically, cells 154 and 156, each having an output potential of 15 volts, in the example under consideration, are provided. The positive terminal 158 of the cell 154 is connected to the junction of leads 58 and 100 through a fuse 160. The negative terminal 162 thereof is connected to the armature 164A of a single-pole double-throw switch 164. A contact 164B of the switch 164 is connected to the lead 98 through a diode 166, the cathode electrode of which is connected to the contact. A contact 164C of the switch 164 is connected to a contact 178A of a switch 178 by a lead 170.

In a similar manner, the negative terminal 172 of the cell 156 is connected to the junction of leads 62 and 98 through a fuse 174. The positive terminal 176 of the cell 156 is connected to the lead 170 and to a contact 178A of single-pole double-throw switch 178. The armature 178B of the switch 178 is connected, through a diode 180, to the lead 100. The diode 180 is polarized so that the anode electrode thereof is connected to the armature 178B. The contact 178C of the switch 178 is unconnected.

The lead 100 is connected to the armature 132A of the witch 132. The terminal of the switch 132 is connected to a terminal 168B of a normally-open push-button switch 168 by a lead 182. The terminal 132B of the switch 132 is unconnected. Also connected to the terminal 168B by a lead 184 are the normally upon sets of contacts 186A and 186B of a relay or relay winding 186. The other end of the set of contacts 186A is connected to the output terminal 92.

The contact 168A of the switch 168 is connected to one end of the relay winding 186, the other end of which is connected to the collector electrode of the transistor 114. In the circuit of FIG. 2, the lamp 116 is connected in parallel with the relay winding 186. Additionally, the terminal 132C of the switch 132 is connected to the terminal 168A of the switch 168 through the normally open set of contacts 186C of the relay 186.

A capacitor 188 is connected across the sets of contacts 186A and 186B. It is to be noted that two serially connected sets of contacts 186A and 186B are utilized to minimize arcing.

The switches 28, 132, 164 and 178 are ganged together as indicated by the dashed lines 136 so that the respective armatures of the switches operate as a unit. That is, for one position of the switches the respective armatures will engage the contacts shown in FIG. 2. For the other position of the switches 28, 132, 164 and 178 and respective armatures will engage the other contacts.

The operation of the circuit of FIG. 2 is substantially similar to that of the circuit of FIG. 1. On charge, the switches 28, 132, 164 and 178 will be in the position shown in FIG. 2. Additionally, the switch 152 is operated to the correct position in accordance with the amplitude of the source 20. The cells 154 and 156 are connected in series between the leads 58 and 62 through the circuit comprising fuse 160, cell 154, armature 164A and contact 164C of the switch 164, lead 170, cell 156 and the fuse 174. Accordingly, the cells 154 and 156 will be charged in the manner noted above.

When it is desired to connect the cells 154 an 156 for discharge across the load 95 the ganged switches 28, 132, 164 and 178 are thrown to the opposite position. Accordingly, cells 154 and 156 will be connected in parallel between the leads 100 and 98. More specifically, cell 154 is connected between the leads 100 and 98 through the circuit comprising fuse 160, cell 154, armature 164A and contact 164B of the switch 164, and the diode 166. The cell 156 is likewise connected between the leads 100 and 98 through the circuit comprising the diode 180, armature 178B and contact 178A of the switch 178, cell 156, and the fuse 174.

It is emphasized that the diodes 166 and 180 are polarized to prevent cross or circulating currents between the cells 154 and 156 since such cross-currents are particularly dangerous with the use of silver-type cells. That is, such cross-currents may initiate an exothermic reaction which can damage both the cells and associated equipment.

When it is desired to connect the load 95 with the cells 154, 156, the button 168 is momentarily depressed. This action connects the transistor 114, relay 186 and the transistor biasing arrangement across the cells through the circuit comprising lead 100, armature 132A and contact 132C of switch 132, lead 182, switch 168, and a lead 189 connected to the contact 168A, and through the aforementioned elements to the lead 98. Relay winding 186 is thereby energized to close sets of contacts 186A, 186B and 186C. Thus, the meter 96 and the load 95 is connected between the energized leads 98 and 100 through the now closed sets of contacts 186A and 186B. Additionally, a holding circuit about relay winding 186 is closed through the circuit comprising energized lead 100, armature 132A and contact 132C, set of contacts 186C, and the lead 189. The operation of the remaining portion of the discharge portion 14 of the circuit of FIG. 2 is substantially the same as that of the circuit of FIG. 1. That is, when the output potential drops below a preselected value, the relay winding 186 is deenergized.

While preferred embodiments of the invention have been shown and described herein, it will become obvious that numerous omissions, changes and additions may be made in such embodiments without departing from the spirit and scope of the present invention.

What is claimed is:

1. Battery apparatus including a battery charger having a pair of input terminals adapted to be connected to a source of energy, a pair of output terminals adapted to be connected to the respective terminals of a battery, circuit means for connecting said pair of input terminals with said pair of output terminals, said circuit means comprising first switch means connected between at least one of said pair of input and output terminals and operable from a first state to a second state in response to the potential of said battery for connecting said source of energy with said battery when said battery potential is below a preselected value, and second switch means connected between said pair of input terminals and responsive to said first switch means for shunting said source of energy away from said first switch means when said first switch means is in said first state, and a discharger connected between said pair of output terminals, said discharger comprising a pair of load terminals adapted to be connected across a load, and third switch means operable to connect said output terminals with said load terminals whereby the battery supplies energy to the load and being responsive to the potential of said battery to disconnect at least one of said pair of load terminals from said one output terminal when the battery potential reaches a predetermined value, said third switch means comprising a relay winding having a first and a second pair of contacts and operable to connect together each contact of said pair of contacts when energized, sensing means connected in series with said relay winding for de-energizing said relay winding when said battery potential reaches said predetermined value, lead means for connecting said first pair of contacts between said one output and load terminals and said second pair of contacts between said one output terminal and said series circuit of said relay winding and said sensing means for establishing a holding circuit therebetween, and selectively operable energizing means for connecting said one output terminal with said series circuit of said relay winding and sensing means to initially energize said relay winding.

2. Battery protection apparatus including a battery charger for charging a battery, said battery charger comprising a pair of input terminals adapted to be connected across a source of potential, a pair of output terminals adapted to be connected to respective terminals of the battery, a first semiconductor switch means having an input electrode connected to said one input terminal, an output electrode connected to one of said output terminals and a control electrode and being operable to switch from a non-conducting to a conducting state in response to a control signal applied to said control electrode to connect together said one input and output terminals, a lead connecting the other of said pair of input terminals with the other of said pair of output terminals, a capacitive reactance connected in series with said first semiconductor switch means, first control signal generating means connected to said one output for applying the control signal to said control electrode of said first semiconductor switch means when the battery potential is below a preselected level, shunt means connected between said input electrode of said first semiconductor switch means and said lead and movable from a non-conducting to a conducting state in response to a second control signal for clamping the potential at said first semiconductor switch means input electrode to a predetermined value, and second control signal generating means connected between said pair of input terminals for applying said second control signal to said shunt means when the potential there across is equal to said predetermined level wherein the minimum value of said predetermined value is equal to said preselected level.

3. Battery protection apparatus as in claim 2, wherein said first semiconductor switch means comprising an SCR having a anode electrode corresponding to said input electrode and connected to said one input terminal, a cathode electrode corresponding to said output electrode and connected to said one output terminal, and a gate electrode corresponding to said control electrode and connected to said first signal generating means.

4. Battery apparatus as in claim 3 in which said capacitive reactance comprises at least a first capacitor, a second capacitor, and means for selectively connecting said first and second capacitors together to provide a selectively variable capacitive reactance.

5. Battery protection apparatus as in claim 3, and a radio frequency filter connected in series with said first SCR.

6. Battery protection apparatus as in claim 3, in which said source of potential is an AC source of potential, and a rectifier connected between said input terminals and having a pair of output terminals, said first semiconductor switch means being connected to said one input terminal through one of said rectifier output terminals and said lead being connected to said other input terminal through said other rectifier output terminal, whereby a DC potential is applied to said first SCR and said shunt means.

7. Battery protection apparatus as in claim 3, in which said shunt means comprises an SCR having an anode electrode connected to said anode electrode of said first SCR, a cathode electrode connected to said lead, and a gate electrode connected to said second control signal generating means.

8. Battery protection apparatus as in claim 3, further including a discharger, said discharger comprising a pair of load terminals adapted to be connected across a load, disconnect means for connecting said one output terminal with one of said pair of load terminals and for disconnecting said one output terminal therefrom in response to the battery terminal potential falling below a desired level, sensing means for sensing the battery terminal potential, isolation means for isolating said sensing means from transient signals, and a lead connecting said other output terminal with the other of said pair of load terminals.

9. Battery protection apparatus as in claim 8, and means for selectively energizing said battery charger when in a first stage, and for energizing said battery discharger and deenergizing said battery charger when in a second state.

10. Battery apparatus as in claim 8, in which said battery comprises a plurality of cells, said discharger further comprising selectively operable connecting means movable for connecting said plurality of cells in series when in a first state and for connecting said cells in parallel when in a second state, unidirectional current conducting means connected with said connecting means and adapted to be connected in series with at lease one cell when said connecting means is in said second state to prevent reverse current flow through said one cell during discharge.

11. Battery apparatus as in claim 10, in which said unidirectional current conducting means comprises a respective diode for each one of said plurality of cells adapted to be connected in series with the associated cell by said connecting means when said connect means is in said second state and to be disconnected therefrom when said connecting means is in said first state.

* * * * *